(12) United States Patent
Torres-Collazo

(10) Patent No.: US 7,241,384 B1
(45) Date of Patent: Jul. 10, 2007

(54) FLOATING STRAINER

(76) Inventor: Angel Torres-Collazo, P.O. Box 3065, Guaynabo, PR (US) 00770

( * ) Notice: Subject to any disclaimer, the term of this patent is extended or adjusted under 35 U.S.C. 154(b) by 268 days.

(21) Appl. No.: 11/147,968

(22) Filed: Jun. 8, 2005

Related U.S. Application Data (60) Provisional application No. 60/615,560, filed on Oct. 1, 2004.

(51) Int. Cl.
B01D 35/05 (2006.01)
(52) U.S. Cl. .................... 210/232; 210/242.1; 210/460
(58) Field of Classification Search ................ 210/232, 210/242.1, 460
See application file for complete search history.

(56) References Cited

U.S. PATENT DOCUMENTS

| | | | | |
|---|---|---|---|---|
| 1,451,394 | A | * | 4/1923 | Hurst .................. 210/162 |
| 3,833,122 | A | | 9/1974 | Cook |
| 3,843,520 | A | * | 10/1974 | Bottorf .................. 210/161 |
| 4,305,819 | A | | 12/1981 | Kobozev et al. |
| 4,405,458 | A | | 9/1983 | McHugh |
| 4,582,609 | A | | 4/1986 | Hunter |
| 4,664,792 | A | | 5/1987 | Fors et al. |
| 4,695,384 | A | | 9/1987 | Ripl et al. |
| 5,052,855 | A | | 10/1991 | Chapman et al. |
| 5,143,605 | A | | 9/1992 | Masciarelli |
| 5,143,623 | A | | 9/1992 | Kroll |
| 5,330,640 | A | | 7/1994 | Fife et al. |
| 5,893,978 | A | | 4/1999 | Yoda et al. |
| 5,997,750 | A | | 12/1999 | Rozelle et al. |
| 6,251,266 | B1 | | 6/2001 | Gannon et al. |
| 6,274,047 | B1 | | 8/2001 | Bates et al. |
| 6,277,287 | B1 | | 8/2001 | Terrien et al. |
| 6,428,711 | B1 | | 8/2002 | Nakamura et al. |
| 6,576,141 | B2 | | 6/2003 | Turner, Jr. et al. |

FOREIGN PATENT DOCUMENTS

| JP | 358128196 A | 7/1983 |
|---|---|---|
| JP | 2002192102 | 5/2004 |
| WO | WO 01 94266 | 12/2001 |

* cited by examiner

*Primary Examiner*—Thomas M. Lithgow
(74) *Attorney, Agent, or Firm*—Hoglund & Pamias PSC; Roberto J. Rios (57) ABSTRACT

A floating strainer is constructed having a rectangular frame. A cylindrical drum is attached to each corner of the rectangular frame. Below the rectangular frame, a box-strainer is fixed. The distance between the box-strainer and the rectangular frame is adjustable so that the level at which water is drawn can be raised or lowered. The bottom of the box-strainer includes hose connections. These are positioned so that the hoses connect at the bottom of the floating strainer and extend vertically down from the bottom. This configuration operates to distribute the weight of the hose and reduce stress and strain on the hose.

8 Claims, 10 Drawing Sheets

FLOATING STRAINER

PRIORITY

Applicant claims the benefit of priority to U.S. Provisional Patent Application No. 60/615,560, which was filed on Oct. 1, 2004.

FIELD OF THE INVENTION

The invention relates generally to a floating strainer used to draw water from a lake or reservoir and more specifically to an improved configuration for a floating strainer that reduces wear on hoses connecting the floating strainer to a pump station.

BACKGROUND OF THE INVENTION

A safe supply of drinking water is a fundamental need worldwide. With growing populations, additional sources of drinking water are in ever increasing demand. Lakes and other fresh-water reservoirs provide one source from which drinking water can be drawn. An example of a system used to draw and purify water from such a source is shown in U.S. Pat. No. 5,997,750, titled "Community Drinking Water Purification System," which issued on Dec. 7, 1999, and which is incorporated by reference in its entirety.

Basically, this type of system requires an intake apparatus to draw water from the source. In some standing bodies of water, the cleanest volume is found near, but not on the surface. Accordingly, water is preferably drawn from a sub-surface layer, near the top of the body of water. Various apparatus have been designed for this purpose. For one example, U.S. Pat. No. 5,052,855, titled "Method and Apparatus for Providing Water for Irrigating Turf Grass," which issued on Oct. 1, 1991, teaches an intake which hangs in the water from a float. A tether between the float and the intake determines the level from which water is drawn. The float is free to move about the body of water, limited only by the hose which is connected to the intake.

A particularly vulnerable portion of this design is found at the connection between the hose and the intake. This portion of the hose forming the joint with the intake suffers the most wear. Because the intake rises and falls along with the float, it tends to stress and strain the joint between the intake and the hose. Likewise, because the intake follows the float, movement of the float will, in turn, flex and twist this joint. Over time the joint will suffer wear and eventually may crack or separate.

A broken hose can cause serious damage to a water filtration system. For one example, if the hose breaks away and falls to the bottom of a lake, it may draw in sand and rocks. These can clog in-line filters and if they flow to an intake pump can cause serious damage.

SUMMARY OF THE INVENTION

In one preferred embodiment of the invention, a floating strainer is constructed to support a plurality of intake hoses of a water pumping system. The floating strainer includes a rectangular frame, four cylindrical drums, four vertical support members and an intake manifold. The rectangular frame has an upper portion and a lower portion. The upper portion and the lower portion are each formed by a first pair of horizontal members extending along a left and a right side of the rectangular frame. In addition, the upper portion and the lower portion are formed by a second pair of horizontal cross members perpendicular to the first pair of horizontal members and extending along a front and a rear of the rectangular frame. The four cylindrical drums each have an upper and a lower bracket extending along the length of the cylindrical drum. A first pair of flanges extends up from the upper bracket and a second pair of flanges extends down from the lower bracket. Each of the first pair of flanges connects with the upper portion of the rectangular frame and each of the second pair of flanges connects with the lower portion of the rectangular frame. Thus, each of the four cylindrical drums is connected along a respective corner of the rectangular frame. Two of the cylindrical drums are positioned along the left side of the rectangular frame and aligned on a common left-side axis. Two of the cylindrical drums are positioned along the right side of the rectangular frame and aligned along a common right-side axis. The four vertical support members are each adjustably connected with and extending down from a respective corner of the rectangular frame. The four vertical support members can be raised or lowered to adjust the level from which water is drawn from the body of water. The intake manifold is supported by the four vertical support members. It includes a box frame a plurality of intake connections. The box frame has outer dimensions that approximately match those of the rectangular frame. The box frame has a substantially solid upper face, mesh side walls and a lower face that defines a plurality of apertures. Each of the four vertical support members connect along a respective corner of the box frame. The plurality of intake connections are each positioned over a respective one of the plurality of apertures in the lower face of the box frame. Each of the intake connections has a tubular body which extends down from the lower face of the box frame and terminates at a hinged collar. The hinged collar has an open and a closed position. The open position is suitable to receive a hose. The closed position fixes the hose in the collar to form a seal between the intake connection and the hose.

According to further aspects of the invention, the floating strainer is constructed of stainless steel. The intake manifold further includes a plurality of removable caps that provide access to the inside of the intake manifold. Each of the removable caps is positioned above a respective one of the intake connections. An anchor restricts movement of the floating strainer to one location. In addition, a plurality of hoses each connect with a respective one of the plurality of intake connections. Each of the hoses has a shoulder around its top end which engages the hinged collar of the intake connection to provide support for the hose. The hose extends vertically down from the respective intake connection.

According to another aspect of the invention, a floating strainer is provided for supporting at least one intake hose of a water pumping system for withdrawing water from a lake. The floating strainer includes a rigid frame, at least one floating means, at least one anchoring means, and a strainer box. The floating means is engaged to the rigid support frame to provide buoyancy to the floating strainer assembly. The anchoring means is engaged to the rigid support frame to prevent displacement of the floating strainer assembly due to water currents. The strainer box engaged to the bottom of the rigid support frame. The strainer box has at least one aperture for installing an inlet end of the intake hose thereby preventing entry of debris and fish into the water pumping system. The strainer box, in combination with the floating means and the anchoring means, serves to support said intake hose at a predetermined depth below the surface of the lake.

According to further aspects of the invention, the rigid support frame is rectangular. The floating means comprise four cylindrical drums. Each of the cylindrical drums is connected with a respective corner of the rectangular frame.

DETAILED DESCRIPTION OF THE INVENTION

In the following detailed description, reference is made to the accompanying drawings which form a part hereof, and in which is shown by way of illustration, specific embodiments in which the invention may be practiced. These embodiments are described in sufficient detail to enable those skilled in the art to practice the invention, and it is to be understood that other embodiments may be utilized and that structural, procedural and system changes may be made without departing from the spirit and scope of the invention. The following detailed description is, therefore, not to be taken in a limiting sense, and the scope of the present invention is described by the appended claims.

Numbering of the figures is usually done with the hundreds and thousands digits corresponding to the figure number, with the exception that the same components may appear in multiple figures.

Figure 1:
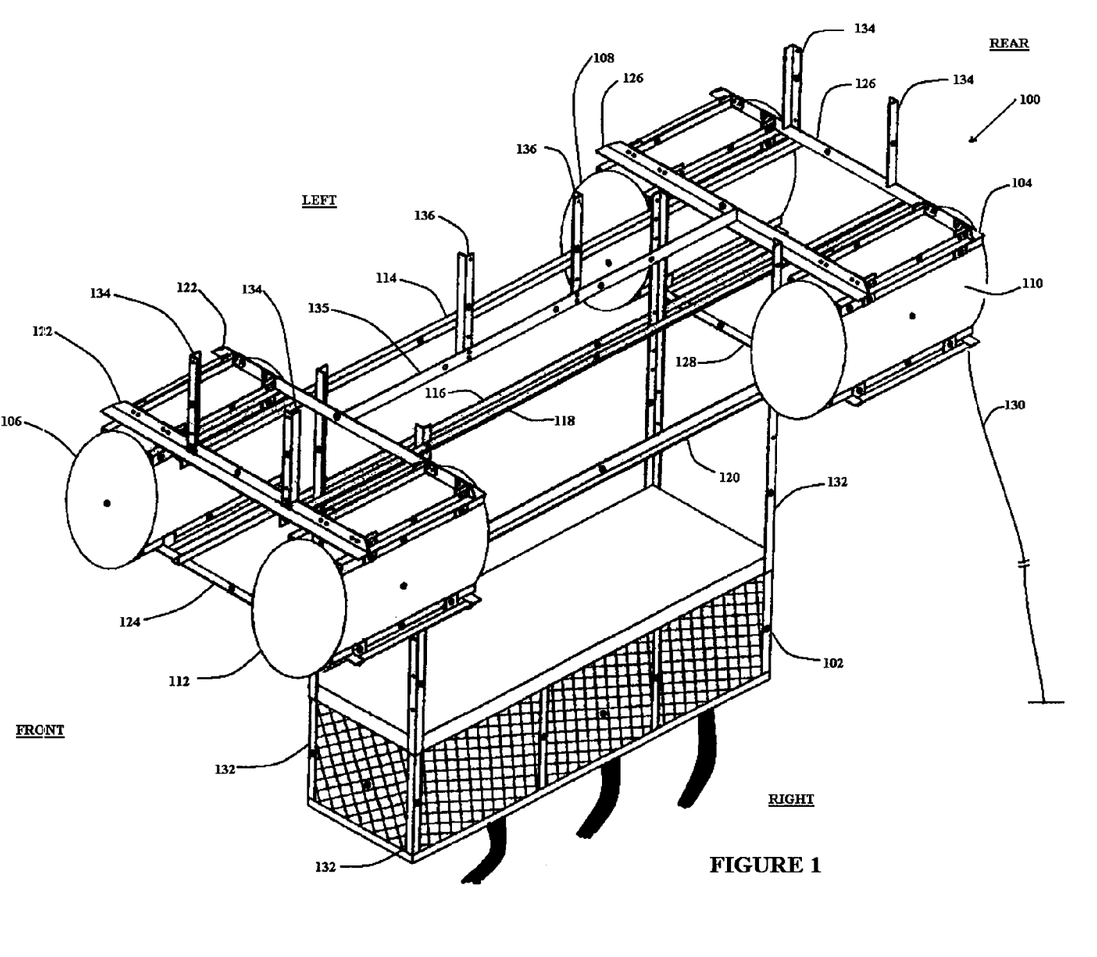
FIG. 1 is a perspective view of one preferred embodiment of a floating strainer 100, including an intake manifold 102, in accordance with the invention.

Turning to FIG. 1, one preferred embodiment of a floating strainer 100 is described. For purposes of description, the reference to the front, rear, right and left are made with respect to the perspective shown in FIG. 1. The floating strainer 100 includes an intake manifold 102 and a floating frame 104 connected by vertical support members 132. More specifically, the floating frame 104 has four drums 106, 108, 110 and 112 positioned along corners of a rectangle. The front-left drum 106 and rear-left drum 108 are oriented along a common axis. Likewise the front-right drum 112 and the rear-right drum 110 are oriented along a common axis. The axis of drums 106 and 108 lies parallel to the axis of drums 110 and 112, and all of the drums 106, 108, 110 and 112 lie in a common, horizontal plane.

The drums are connected by the floating frame 104. Specifically, the front-left drum 106 and the front-right drum 112 are connected by a pair of front-upper cross-members 122. These run parallel and connect along the top of the drums 106 and 112. One connects with the drums 106 and 112 toward the front and one connects toward the rear. In addition, the front-left drum 106 and the front-right drum 112 are connected by a pair of front-lower cross members 124. These also run parallel and connect along the bottom of the drums 106 and 112. One connects with the drums 106 and 112 toward the front and one connects toward the rear.

The rear-left drum 108 and the rear-right drum 110 are connected by a pair of rear-upper cross-members 126. These run parallel and connect along the top of the drums 108 and 110. One connects with the drums 108 and 110 toward the front and one connects toward the rear. In addition, the rear-left drum 108 and the rear-right drum 110 are connected by a pair of rear-lower cross members 128. These also run parallel and connect along the bottom of the drums 108 and 110. One connects with the drums 108 and 110 toward the front and one connects toward the rear.

The front pair of drums 106 and 112 connect with the rear pair of drums 108 and 110 by a set of four frame members 114, 116, 118 and 120. The upper frame members 114 and 118 extend all the way from the forward-most cross-member 122 to the rear-most cross member 126. Likewise, the lower frame members 116 and 120 extend all the way from the forward-most cross-member 124 to the rear-most cross-member 128.

The upper frame members 114 and 118, along with the rear-most front-upper cross member 122 and the front-most rear-upper cross member 126, define an upper, interior, rectangular frame. The corners of this upper, interior, rectangle frame are each proximate to the inner-most corners of the drums 106, 108, 110 and 112.

The lower frame members 118 and 120, along with the rear-most front-lower cross member 124 and the front-most rear-lower cross member 128, define a lower, interior, rectangular frame. The dimensions of the lower, interior, rectangular frame match those of the upper, interior, rectangular frame. The corners of this lower, interior, rectangle frame are each proximate to the inner-most corners of the drums 106, 108, 110 and 112.

The upper frame members 114 and 118 lie in a horizontal plane as do lower frame members 116 and 120. A set of four vertical frame members 132 join with the frame members 114, 116, 118 and 120. Specifically, each one of the vertical frame members 132 join the upper frame members 114 and 118 at a corner of the upper, interior, rectangular frame. And, each one of the vertical frame members 132 join the lower frame member 116 and 120 at a corner of the lower, interior, rectangular frame. The two rectangular frames are aligned so that the vertical frame member 132 are perpendicular to the horizontal frame members 114, 116, 118 and 120.

On the top, the vertical frame members 132 terminate just above the joint with the horizontal frame members 114 and 116. They extend down past the horizontal frame members 118 and 120 to the bottom of the intake manifold 102.

A set of warning brackets extend up from the floating frame 104. These warning brackets are used to warn boats and other water vehicles of the floating strainer. Specifically, a pair of warning brackets 134 extend up from the front-most cross-member 122 and a pair of warning brackets 134 extend up from the rear-most cross-member 126. These identify the front and back of the floating strainer. In addition, horizontal beam 135 connects the rear-most cross-member 122 to the front-most cross-member 126. A pair of side warning brackets 136 extend up from the horizontal beam 135. These are used to warn that it is not possible to pass between the warning brackets 134, located at opposite ends of the floating strainer 100.

To hold the floating strainer in place, an anchor chain 130 attaches to the floating frame 104. Preferably the floating strainer is constructed of stainless steel.

Figure 2:
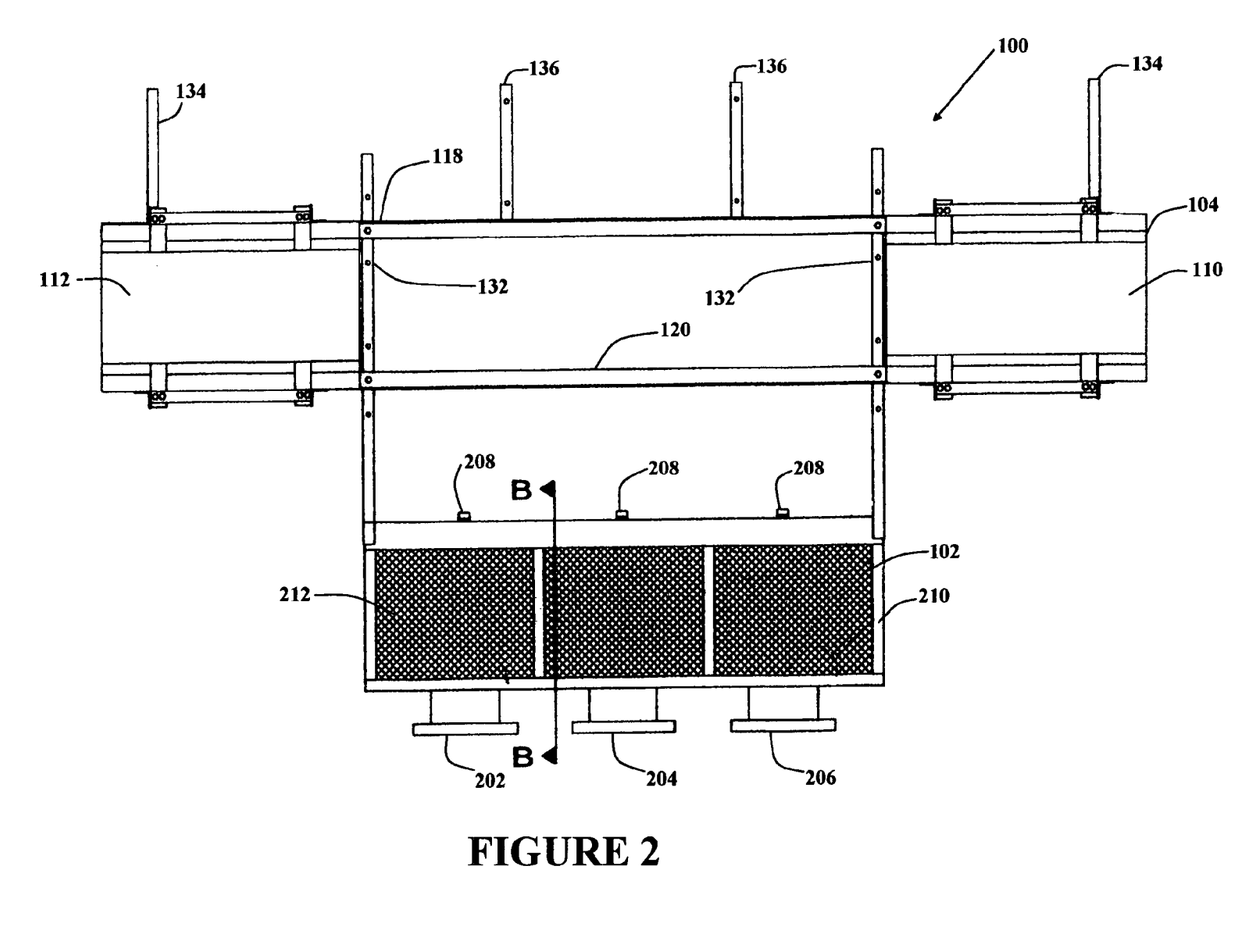
FIG. 2 is a side view of the floating strainer of FIG. 1.

Turning to FIG. 2, a right-side view of the floating strainer 100 is shown. From this perspective, front-right drum 112 and rear-left drum 110 are in view. They are connected by floating frame 104, and more specifically, by upper-right and lower-right frame members 118 and 120. Additional details of this connection are shown and described with reference to FIGS. 9A and 9B. Warning brackets 134 and 136 extend up from floating frame 104. Vertical support members 132 extend down from floating frame 104 and connect with intake manifold 102. Vertical support members 132 can be adjusted to vary the distance between the floating frame 104 and the intake manifold 102. This permits an operator to choose the level at which water is drawn from below the surface. The adjustment is made by selecting the attachment holes between the vertical support members 132 and floating frame 104.

The intake manifold 102 has an outer, box frame 210. It has a horizontal length and width that matches that of the upper and lower rectangle formed by the floating frame 104. Thus, the vertical support members 132 meet the box frame 210 at its outer corners. The right and left sides of box frame 210 define three square areas, which are filled with a mesh 212. The front and rear sides of box frame 210 also define square areas, which are filled with the mesh 212. The top side of box frame 210 is solid, with three caps 208. These may be removed to provide access to the interior of the intake manifold 102. The bottom side of box frame 210 is also solid, but includes three intake connections 202, 204 and 206. These are used to connect with a hose and are further shown and described with reference to FIGS. 8-10.

Figure 3:
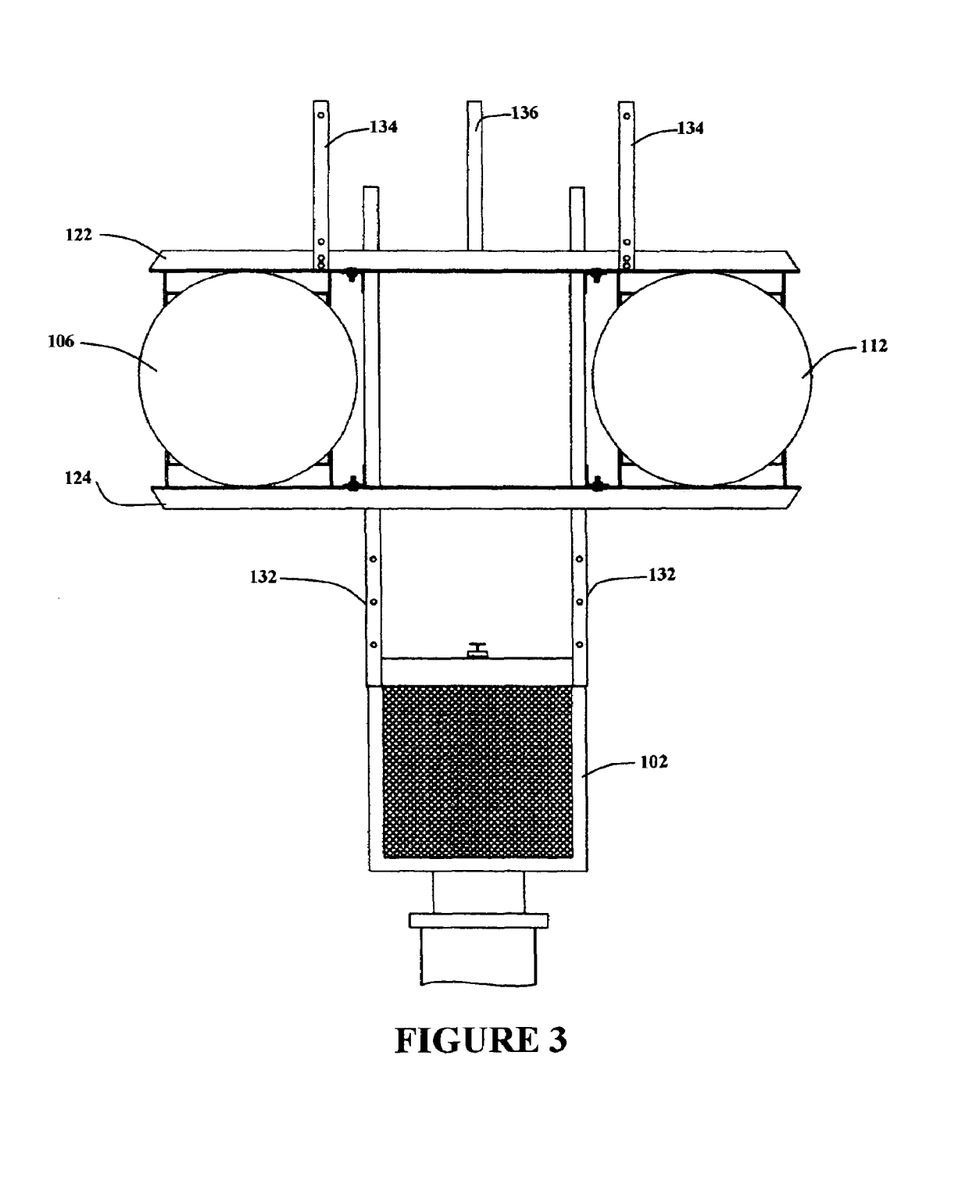
FIG. 3 is a front view of the floating strainer of FIG. 1.

Turning to FIG. 3, a front side view of the floating strainer 100 is shown. From this perspective, front-left drum 106 and front-right drum 112 are in view. Upper cross member 122 and lower cross member 124 connect these drums 106 and 112. Warning brackets 134 and 136 extend upward. Vertical support members 132 extend down to the intake manifold 102. Below the intake manifold 102, intake connection 202 extends downward to join with a hose to a pump system. The configuration as shown helps to reduce the stress and strain on these connections. Because the intake manifold 102 is narrower than the floating frame 104, disturbances on the surface of the body of water are smoothed. The intake manifold generally experiences up and down movement with rises and falls in the surface of the water but experiences reduced rocking or sideways movement, which is smoothed by the floating frame.

Figure 4:
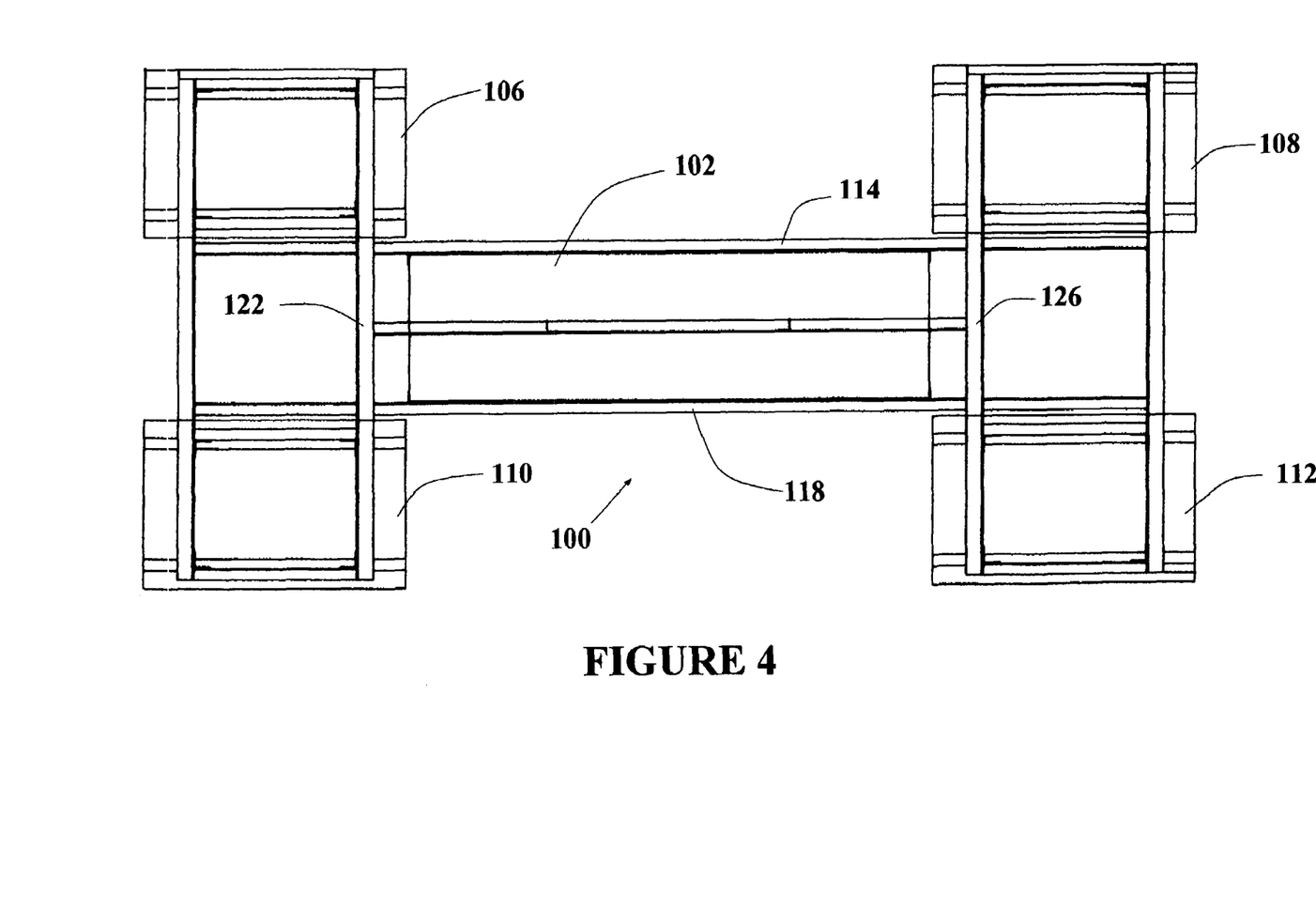
FIG. 4 is a top, plan view of the floating strainer of FIG. 1.

Turning to FIG. 4, a top view of the floating strainer 100 is shown. The floating frame 104 defines a rectangle formed by upper left frame member 114, cross member 122, upper right frame member 118 and cross member 126. An inner corner of each drum 106, 108, 110 and 112 joins with an outer corner of this rectangle. Also, the dimensions of this rectangle are approximately equal to the horizontal dimensions of the intake manifold 102.

Figure 5A:
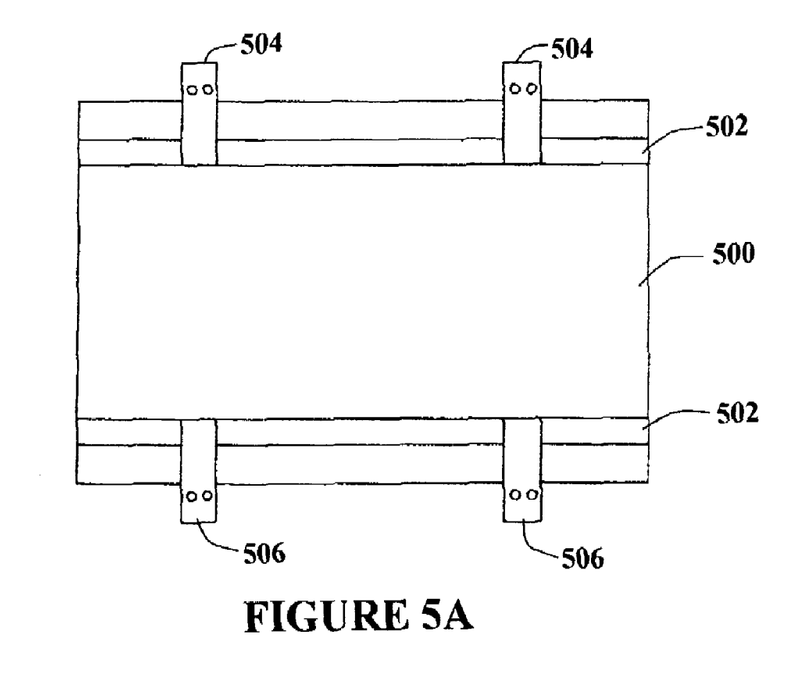
FIG. 5A is a side view of a drum assembly used to support the floating strainer of FIG. 1.
Figure 5B:
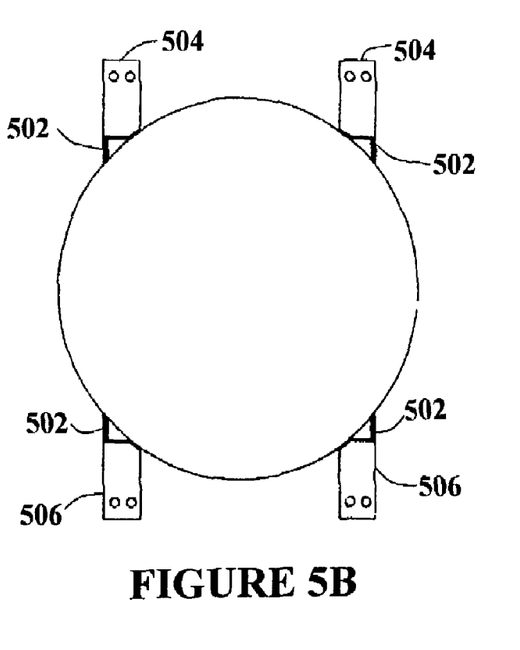
FIG. 5B is a front view of a drum assembly of FIG. 5A.

Turning to FIGS. 5A and 5B, a more detailed view of a drum is shown. The assembly permits the mounting of a drum onto the floating frame 104. Specifically, drum 500 has four angle brackets 502 which extend along its length. The angle brackets 502 are elongated pieces of steel in an "L" shape. The inner angle of the "L" faces the drum so that each of the angle brackets makes rib along the drum 500, and each rib has a vertical and horizontal surface.

Two of the four angle brackets 502 are positioned on top and two on bottom. Likewise, two of the four are positioned on its right side and two on its left. These form a square shoulder along the round face of the cylindrical drum.

Along each of the two brackets 502 positioned along the top of drum 500, a pair of flanges 504 extend upward. The flanges 504 are also constructed from a "L"-shaped steel. The flanges 504 join the angle brackets 502 at a right angle. A pair of holes are placed along the top of each side of the flange 504. These four mounting holes are used to connect the drum 500 to the floating frame 104 (shown in FIG. 1). Specifically, these are used to connect flanges 504 with the upper members 114 and 118 as well as to the upper cross members 122 and 126.

Along each of the two brackets 502 positioned along the bottom of drum 500, a pair of flanges 506 extends downward. The flanges 506 are also constructed from a "L"-shaped steel. The flanges 506 join the angle brackets 502 at a right angle. A pair of holes are placed along the bottom of each side of the flange 506. These four mounting holes are used to connect the drum 500 to the floating frame 104 (shown in FIG. 1). Specifically, these are used to connect flanges 506 with the lower members 116 and 120 as well as to the lower cross members 124 and 128.

Figure 6:
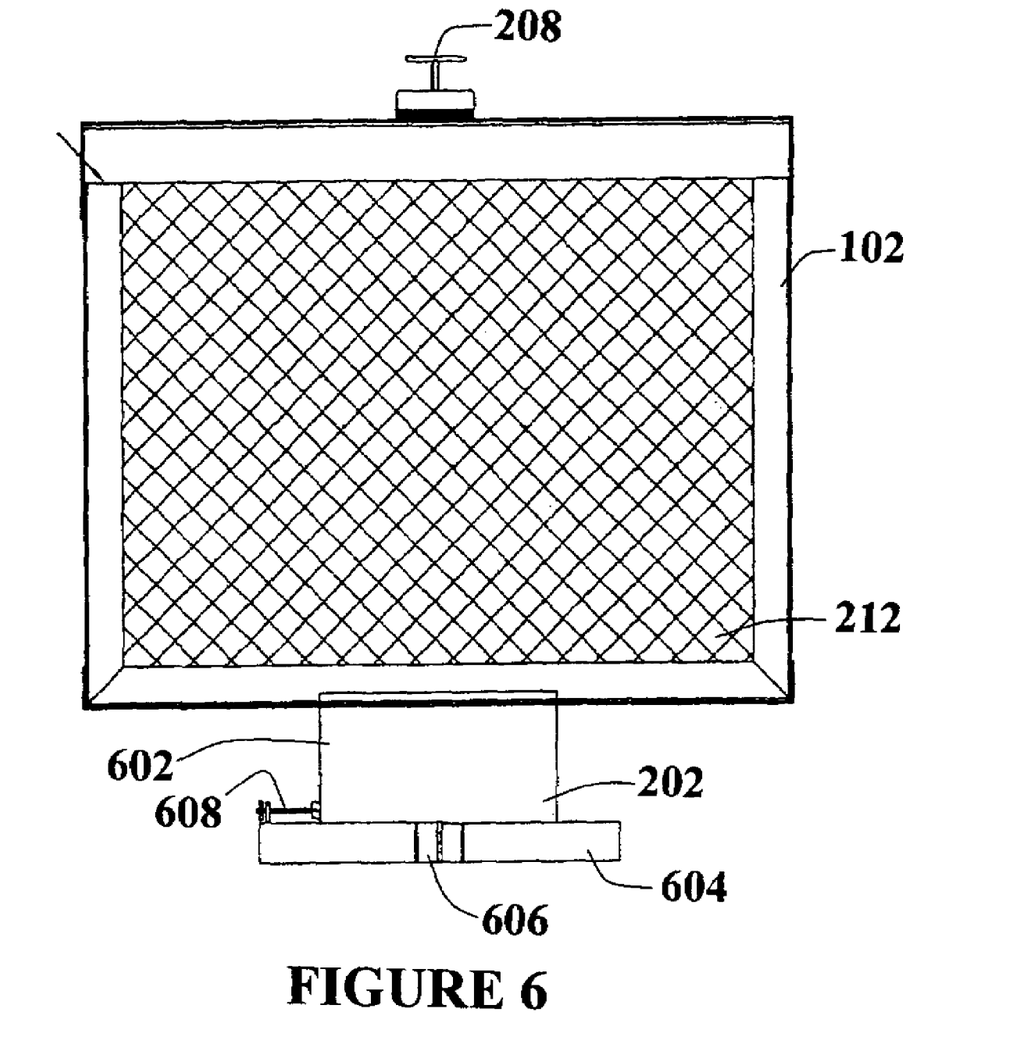
FIG. 6 is a cross-sectional view of the intake manifold 102 of FIG. 2, shown disconnected from water hoses. The view is taken along B-B.

Turning to FIG. 6, a cross section of the intake manifold 102 is shown. The view is from the section B-B identified in FIG. 2. From this view, the interior side of mesh 212 is shown. Again, cap 208 screws onto the solid top face of the intake manifold 102. A handle is attached so that this cap can be unscrewed and removed for access into the intake manifold.

On the bottom side, intake connection 202 extends downward. Intake connection 202 consists of a body 602 formed as a tube having a diameter approximately equal to the diameter of the hose to which it will attach. Body 602 terminates at a collar 604. The collar is divided and hinged so that it can open to accept the top end of a hose. When closed along the hinge 606, the collar 604 forms a ring which is held in the closed position by bolt 608.

Figure 7:
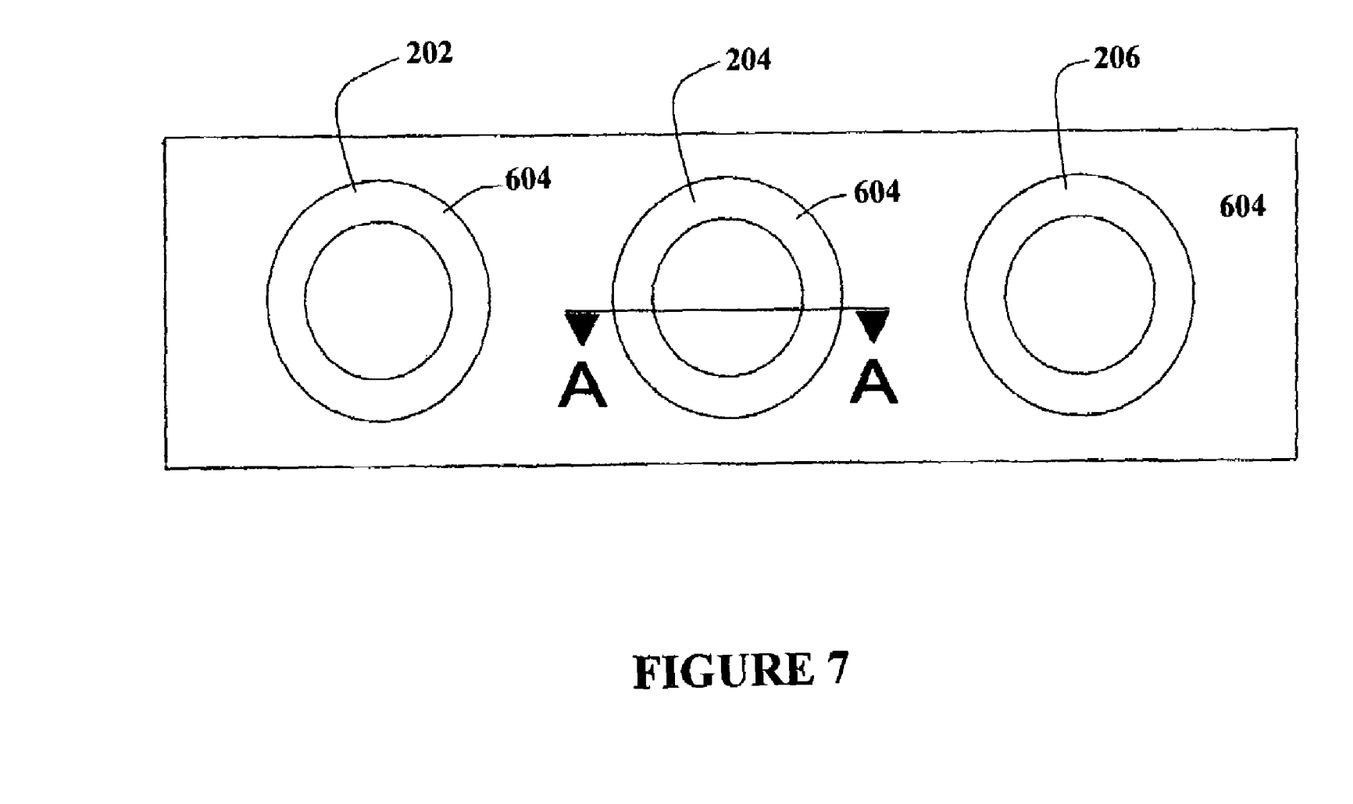
FIG. 7 is a bottom view of the intake manifold 102 of FIG. 1, shown disconnected from water hoses.

Turning to FIG. 7, a bottom view of the intake manifold 102 is shown. It includes three intake connections 202, 204, 206. These are aligned in a row so that intake connection 202 is associated with a front section of the intake manifold. Intake connection 204 is associated with a middle section and intake connection 206 is associated with a rear section. Each intake connection consists of a collar 604 that is used to form the connection with the hose. The outer ring 604 defines an aperture which is the area though which water will pass from the intake manifold 102 to the hose.

Figure 8:
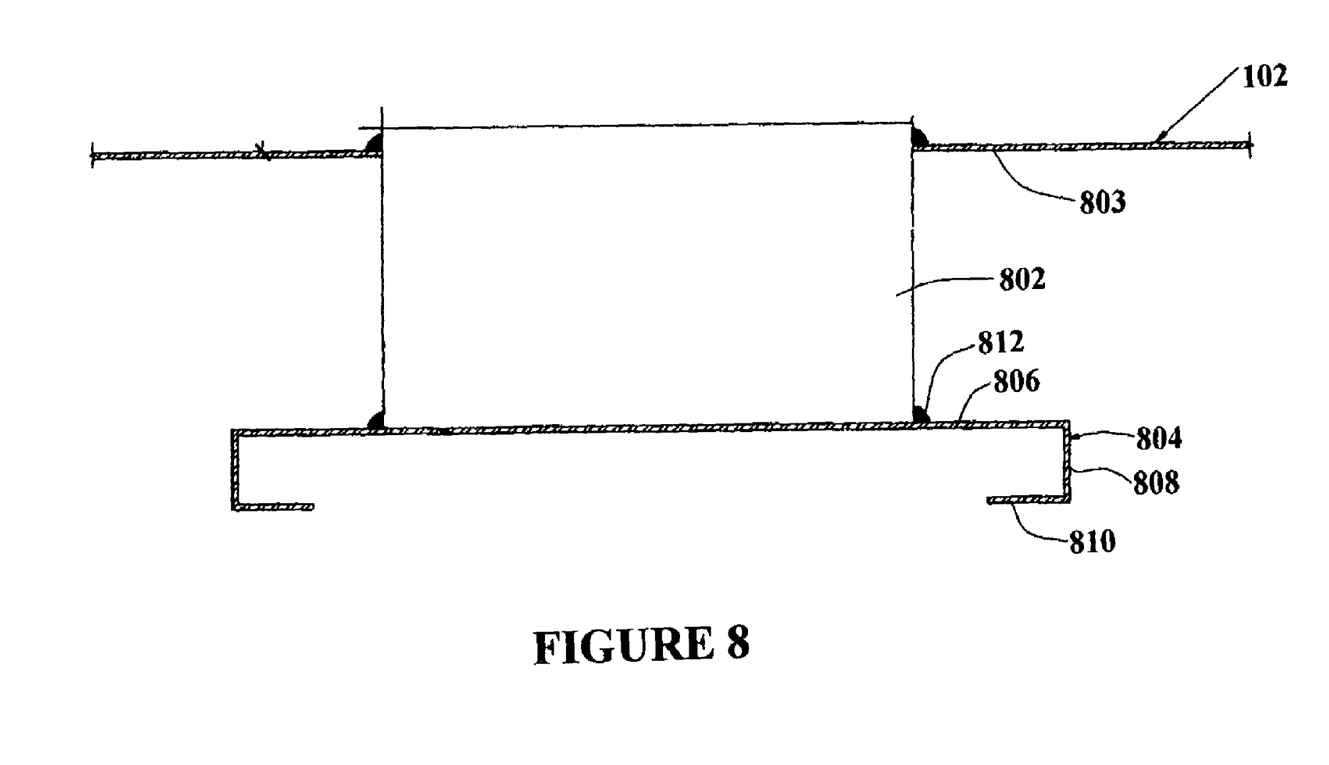
FIG. 8 is a cross-sectional view of the intake manifold of FIG. 7, along section A-A.

Turning to FIG. 8, a cross-sectional view of the intake connection 204 is shown. It includes a body 802, formed from a pipe. At the top end of body 802, it joins the bottom face 803 of the intake manifold 102. This face is solid but defines an aperture sized to pass body 802. The seam of a weld seals body 802 to the bottom face 803. Body 802 terminates in a collar 804, which has a top face 806, a side face 808 and a bottom face 810. The top face 806 defines an aperture having a diameter approximately the same as that of the body 802, though slightly smaller. The bottom of body 802 is placed against the top face 806 and positioned so that the aperture aligns with the interior of the body 802. In this position, a weld 812 seals the body 802 to the top face 806. The side face 808 extends down perpendicular to the top face 806. It forms a ring with a vertical wall. The bottom face 810 extends in from the bottom of side face 808. It also forms a ring, but with a horizontal wall. Along its inside, it defines a circular aperture having a diameter which is approximately the same size as the hose to which it connects.

Figure 9:
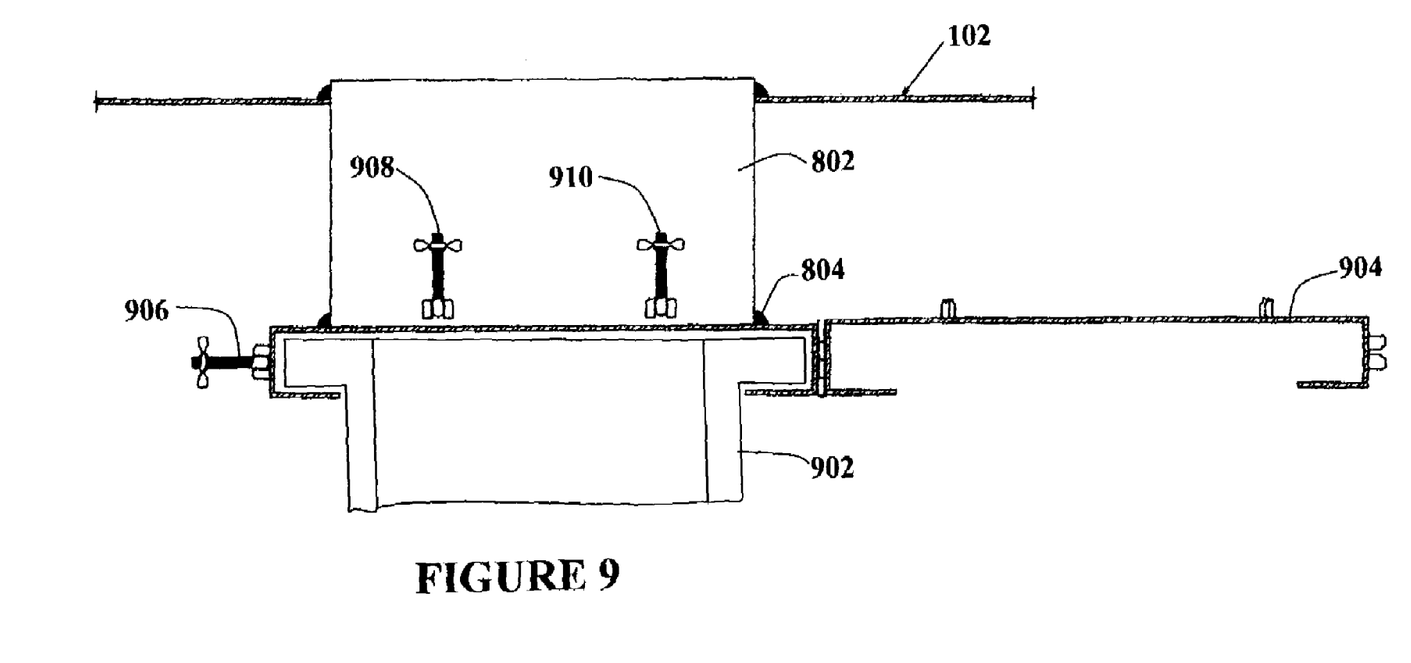
FIG. 9 is a side view of the intake manifold of FIG. 8, shown in an open position with a hose in place.

Turning to FIG. 9, a side view of the intake connection is shown. A hose 902 (shown in cross section) is positioned in the collar 804. The hinged portion 904 is swung open so that the hose 902 will fit in place. The top of the hose 902 has a shoulder that essentially fills the collar 804 of the intake connection. When the hinged portion 904 is swung to its closed position, three pivoting bolts 906, 908 and 910 will hold it in place.

Figure 10:
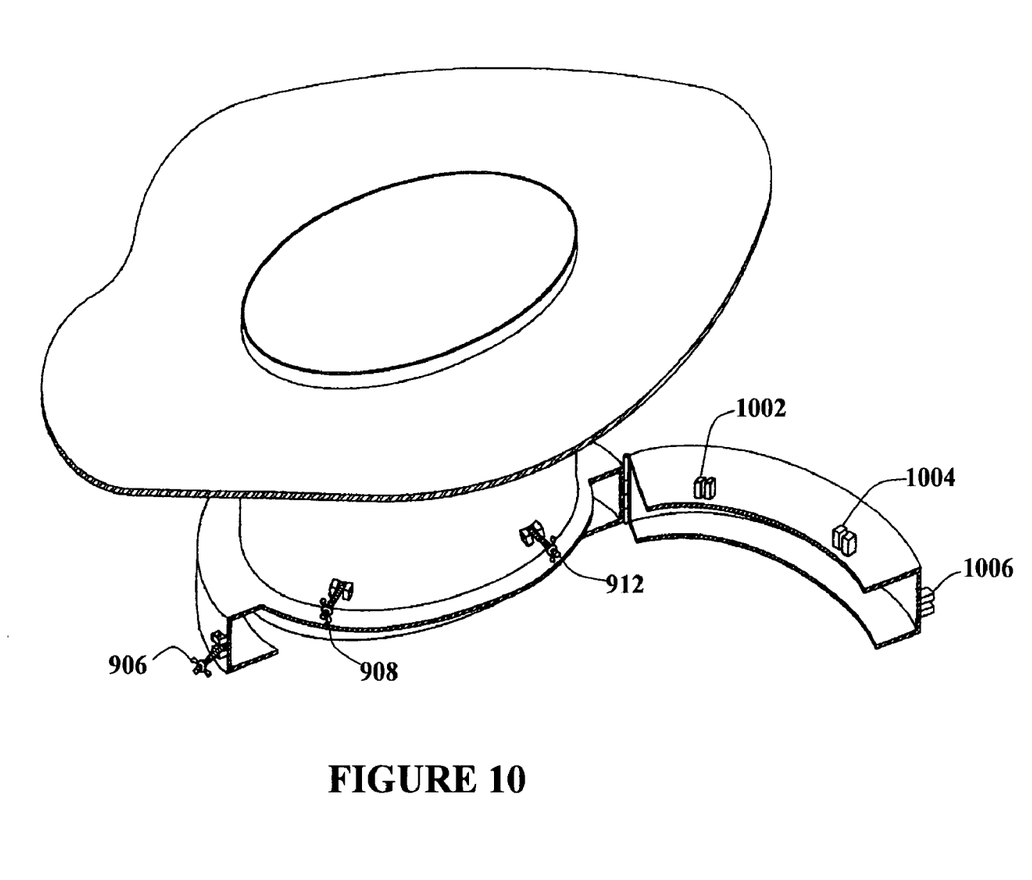
FIG. 10 is a perspective view of the intake manifold of FIG. 9, shown in an open position but without the hose.

This is shown from a perspective view in FIG. 10. Here the hinged portion 904 is swung open. It includes three sets of flanges 1002, 1004 and 1006. Two of the sets of flanges 1002 and 1004 are on the top face of the hinged portion 904. When it is swung closed, pivoting bolt 910 swings down to engage flange 1002 and pivoting bolt 908 swings down to engage flange 1004. The side face of the hinged portion 904 also includes a set of flanges 1006. When the hinged portion 904 is swung closed, pivoting bolt 906 engages flanges 1006. Wing nuts on each of the pivoting bolts 906, 908 and 910 tighten against the respective flanges. This operates to secure the hose in place.

One significant advantage of this configuration involves the attachment of the hose to the intake manifold. The hose attaches to the bottom side and its weight is fully supported by the floating strainer. Because the weight of the hose is distributed about the entire collar 804, no single part of the hose bears a disproportionate load. This increases hose life and reduces wear.

In addition, because the hose connections are positioned within the drums that are used to provide buoyancy, they are less susceptible to waves. Provided that the waves are smaller than the floating strainer, it will insulate the hoses from any particular wave or crest. The hoses will experience only relatively gradual rises and falls as the floating strainer itself rises or falls with the surface of the water.

Although the invention has been described with reference to specific preferred embodiments, those skilled in the art will appreciate that many modifications and variations are possible without departing from the spirit and scope of the invention. All such modifications and variations are intended to be encompassed within the following claims.

I claim:

1. A floating strainer especially suitable for supporting a plurality of intake hoses in a pumping system for withdrawing water from a body of water comprising:
    a rectangular frame having an upper portion and a lower portion, wherein the upper portion and the lower portion are each formed by a first pair of horizontal members extending along a left and a right side of the rectangular frame and a second pair of horizontal cross members perpendicular to the first pair of horizontal members extending along a front and a rear of the rectangular frame;
    four cylindrical drums, each one having an upper and a lower bracket extending along the length of the cylindrical drum and having a first pair of flanges extending up from the upper bracket and a second pair of flanges extending down from the lower bracket, and wherein each of the first pair of flanges connects with the upper portion of the rectangular frame and each of the second pair of flanges connects with the lower portion of the rectangular frame so that each of the four cylindrical drums is connected along a respective corner of the rectangular frame and wherein two of the cylindrical drums are positioned along the left side of the rectangular frame and aligned on a common left-side axis and two of the cylindrical drums are positioned along the right side of the rectangular frame and aligned along a common right-side axis;
    four vertical support members, each one adjustably connected with and extending down from a respective corner of the rectangular frame, wherein the four vertical support members can be raised or lowered to adjust the level from which water is drawn from the body of water; and
    an intake manifold supported by the four vertical support members comprising:
        a box frame having outer dimensions that approximately match those of the rectangular frame, wherein the box frame has a substantially solid upper face, mesh side walls and a lower face that defines a plurality of apertures, and wherein each of the four vertical support members connect along a respective corner of the box frame; and
        a plurality of intake connections each one positioned over a respective one of the plurality of apertures, wherein each of the intake connections has a tubular body which extends down from the lower face of the box frame and terminates at a hinged collar, wherein the hinged collar has an open and a closed position, wherein the open position is suitable to receive a hose, and wherein the closed position fixes the hose in the collar to form a seal between the intake connection and the hose.

2. The floating strainer of claim 1, wherein the floating strainer is constructed of stainless steel.

3. The floating strainer of claim 2, wherein the intake manifold further comprises a plurality of removable caps that provide access to the inside of the intake manifold, and wherein each of the removable caps is positioned above a respective one of the intake connections.

4. The floating strainer of claim 3, further comprising an anchor to fix the floating strainer in one location.

5. The floating strainer of claim 4, further comprising a plurality of hoses each one of which connects with a respective one of the plurality of intake connections wherein each of the hoses has a shoulder around its top end which engages the hinged collar of the intake connection to provide support for the hose and wherein the hose extends vertically down from the respective intake connection.

6. A floating strainer for supporting at least one intake hose of a water pumping system for withdrawing water from a lake, said assembly comprising:
    a rigid support frame;
    at least one floating means engaged to said rigid support frame to provide buoyancy to the floating strainer assembly;
    at least one anchoring means engaged to said rigid support frame to prevent displacement of the floating strainer assembly due to water currents; and
    a strainer box engaged to the bottom of the rigid support frame, said strainer box having at least one aperture for installing an inlet end of said intake hose thereby preventing entry of debris and fish into the water pumping system;
    wherein said strainer box, in combination with said floating means and said anchoring means, serves to support said intake hose at a predetermined depth below the surface of the lake.

7. The floating strainer of claim 6, wherein said rigid support frame comprises a rectangular frame.

8. The floating strainer of claim 7, wherein said at least one floating means comprise four cylindrical drums, wherein each of the cylindrical drums is connected with a respective corner of the rectangular frame.

* * * * *